United States Patent
Kim et al.

[11] Patent Number: 5,896,680
[45] Date of Patent: *Apr. 27, 1999

[54] SHOES COMPRISING THREE-DIMENSIONAL FORMED FIBER PRODUCT

[75] Inventors: Dai W. Kim, Chatham, N.J.; William E. Bessey, Charlotte, N.C.; John Nagel, Frankfurt, Germany; Gregory M. Clark, Weston, Conn.; Joseph S. W. Haas, Charlotte; Etheridge O. Oakley, Jr., Matthews, both of N.C.

[73] Assignee: Hoechst Celanese Corporation, Somerville, N.J.

[*] Notice: This patent is subject to a terminal disclaimer.

[21] Appl. No.: 08/770,026

[22] Filed: Dec. 19, 1996

Related U.S. Application Data

[60] Provisional application No. 60/009,061, Dec. 22, 1995.

[51] Int. Cl.$^6$ .............................. A43B 13/18; A43B 7/06; A43B 23/07
[52] U.S. Cl. .................................. 36/28; 36/87; 36/3 R; 36/3 B; 36/3 A; 36/55; 36/43
[58] Field of Search ................................. 36/28, 3 B, 43, 36/55, 3 R, 3 A, 87

[56] References Cited

U.S. PATENT DOCUMENTS

| Re. 31,345 | 8/1983 | Swartzkopff et al. . |
|---|---|---|
| 1,219,890 | 3/1917 | West . |
| 2,029,370 | 2/1936 | Heldenbrand . |
| 3,219,514 | 11/1965 | De Roysancour . |
| 3,691,004 | 9/1972 | Werner et al. . |
| 3,906,185 | 9/1975 | Gross et al. . |
| 4,128,684 | 12/1978 | Bomio et al. . |
| 4,212,692 | 7/1980 | Rasen et al. . |
| 4,252,590 | 2/1981 | Rasen et al. . |
| 4,263,727 | 4/1981 | Bender et al. . |
| 4,584,228 | 4/1986 | Droste . |
| 4,631,221 | 12/1986 | Disselbeck et al. . |
| 4,656,760 | 4/1987 | Tonkel et al. . |
| 4,673,616 | 6/1987 | Goodwin . |
| 4,890,877 | 1/1990 | Ashtani-Zarandi et al. . |
| 5,022,168 | 6/1991 | Jeppson, III et al. . |
| 5,158,821 | 10/1992 | Gebauer et al. . |
| 5,255,451 | 10/1993 | Tong et al. . |
| 5,354,604 | 10/1994 | Blakeman et al. . |
| 5,364,686 | 11/1994 | Disselbeck et al. . |
| 5,401,564 | 3/1995 | Lee et al. . |
| 5,447,776 | 9/1995 | Desselbeck . |
| 5,720,118 | 2/1998 | Mayer et al. . |
| 5,731,062 | 3/1998 | Kim et al. . |

FOREIGN PATENT DOCUMENTS

| 324714 B1 | 7/1989 | European Pat. Off. . |
|---|---|---|
| 0 373 330 A1 | 6/1990 | European Pat. Off. .......... A43B 5/00 |
| 386864 B1 | 9/1990 | European Pat. Off. . |
| 0 436 764 A1 | 7/1991 | European Pat. Off. ........ A43B 17/00 |
| 386387 B1 | 5/1992 | European Pat. Off. . |
| WO 92/00191 | 10/1992 | WIPO ............................ B32B 27/00 |

OTHER PUBLICATIONS

Patent Abstracts of Japan, vol. 18, No. 12 (C–1150), Jan. 11, 1994 & JP 05 247834 A (Toyobo Co. Ltd), Sep. 24, 1993 & Database WPI, Sec. CH, Week 9343, Derwent Pub. Ltd., London, GB; AN–93–340252 (43) & JP 05 247 834 A (Toyobo K.K.), Sep. 24, 1993.

*Primary Examiner*—Ted Kavanaugh
*Attorney, Agent, or Firm*—Alston & Bird LLP

[57] ABSTRACT

Shoes for use in demanding applications, primarily athletics, are made from a three-dimensional fiber network that is semi-rigid and resilient. The fiber network is made from a textile fabric that has an array of projections made from the same fabric rising from the plane of the fabric.

27 Claims, 3 Drawing Sheets

SHOES COMPRISING THREE-DIMENSIONAL FORMED FIBER PRODUCT

RELATED APPLICATIONS

Commonly assigned U.S. Pat. No. 5,731,062, filed Dec. 22, 1995; commonly assigned U.S. application Ser. No. 09/046,165, filed Mar. 23, 1998, still pending, which is a divisional of U.S. Pat. No. 5,731,062; commonly assigned U.S. application Ser. No. 08/754,953, filed Nov. 21, 1996, still pending, which claims the benefit of U.S. Provisional Application No. 60/009,057, filed Dec. 22, 1995; and commonly assigned U.S. application Ser. No. 08/767,506, filed Dec. 16, 1996, still pending, which claims the benefit of U.S. Provisional Application No. 60/009,143, filed Dec. 22, 1995, all contain related subject matter. This application claims benefit of Provisional application 60,009,061 Dec. 22, 1995.

FIELD OF THE INVENTION

This invention relates generally to shoes and more specifically to shoes that possess greater breathability, less weight, and greater cushioning, which makes them useful in athletic footwear.

BACKGROUND OF THE INVENTION

There has been a continuing need for better athletic footwear. Better cushioning is desirable for protecting the feet, knees and other joints from injury, especially injury resulting from repeated impact, as occurs in running. Cushioning materials, such as foams, are known and used, but these restrict the movement of air in the shoe and act as thermal insulators, making the feet feel warm and causing increased perspiration. Materials that permit unrestricted air circulation around the feet are expected to minimize problems of heat and perspiration. Light weight is another desirable attribute in a shoe material.

Three-dimensional fiber networks are known materials. These are generally derived from textile fabrics that have been impregnated with a thermoset polymer or a low melting thermoplastic and then molded into the desired shape, followed by curing in the case of a thermoset. For the most part, these materials are stiff and are used as lightweight structural materials. For example, U.S. Pat. No. 4,631,221 describes laminates utilizing a rigid three-dimensional fiber network sandwiched between two layers of rigid sheet. The three-dimensional fiber network has a regular series of projections and is impregnated with a thermoset resin, which makes it stiff. U.S. Pat. No. 4,890,877 describes an energy absorbing material for use in automobile doors. The energy absorbing material is made from a highly stretchable lightweight fabric that has been coated with a resin and then shaped into an array of projections. This energy absorbing material after shaping does not appear to have retained its net-like appearance.

The three-dimensional fiber networks known up to now are lightweight and breathable, but they do not appear to have the flexibility to be used in environments where the shape of the network changes repeatedly, nor do they have the resiliency to act as energy absorbing materials.

SUMMARY OF THE INVENTION

Shoes for use in demanding applications, primarily athletics, are improved by utilizing a three-dimensional fiber network structure that is semi-rigid, dimensionally stable, and flexible. Three dimensional fiber networks are described in detail below. The three-dimensional fiber networks may be used in the midsole (insole) of the shoe, as a collar liner, or as, a tongue liner. The fiber networks vary somewhat in the dimensions of the fibers and projections for each specific end use, as described below. Although the fiber networks described herein are extremely advantageous in athletic shoes, they may be used in other kinds of footwear also, including boots and dress shoes.

These fiber networks can be bent or flexed repeatedly without loss of properties. The fiber networks have excellent breathability and are very lightweight. They also provide support and contribute to the cushioning characteristics of the shoe. The fiber network structures are compressible, and when the compressive force is removed, the materials return to their original shape (i.e. they are resilient). These fiber network structures comprise filaments that are generally made of a single thermoplastic polymer or copolymer, or a polymer blend or alloy, and do not normally include a thermoset polymer. The networks are made up of a multiplicity of projections rising from the plane of the textile fabric from which the fiber network is made. Projections are portions of the textile fabric that rise above the base plane, generally in an abrupt way. Depressions, which are projections on the opposite side and in the opposite direction from the base plane, may optionally also be present. The projections and optional depressions have retained an open fabric-like appearance, comprising discrete filaments which are generally not bonded at the intersections where the individual filaments cross over one another. There may be bonds at the intersections if the attachments are easily broken (i.e. they are not "tightly bonded") when the network is initially compressed, after which the network becomes resilient. The network is "resilient" if the projections and optional depressions substantially recover their shape after being compressed to 50% of their height. However, there may be minor changes in the shapes of the projections and optional depressions, as for example a change in the curvature of the edges at the top of the projection. As the density of tight bonds at the points at which the fibers cross over one another increases, the fiber network structure and the projections become more rigid, and the projections lose their resilience.

An example of a three-dimensional fiber network structure having regularly spaced projections which have a square base and a square top that has shorter sides than the base is shown in FIGS. 1 and 2. Another preferred structure consists of a regular array of projections which are truncated cones of similar size and shape, as shown in FIG. 3, for example.

Because of the open structure of the textile fabric and the large void volume within the projections and/or depressions, the network has a low density compared with the polymer (generally less than about 10%, preferably less than about 5%) based on the amount of space occupied by the network. Air and other fluids can flow through the fiber network structure with little resistance. The filaments are generally in the form of a monofilament having a diameter of at least about 0.1 mm, corresponding to about 100 dpf in the case of poly(ethylene terephthalate). The filaments used in the fiber networks may also be derived from multifilament yarns having approximately the same total diameter, provided that the individual filaments of the yarns have coalesced to larger filaments under heat and pressure during the shaping process, and further provided that the multifilament yarns have not become so firmly bonded at the points where they cross over one another that these bonds can't be broken when the fiber networks are compressed. When the filaments are derived from a multifilament yarn, the yarn may be a hybrid yarn or may contain bicomponent fibers. Preferably, the multifilament yarn is made up of a single thermoplastic polymer in the form of a yarn.

For the upper part of the shoe (i.e. the collar lining and tongue liner), the fiber network structure can be softer than is used in the midsole of the shoe. In this application, the filaments may be individual filaments of a multifilament yarn in which the individual filaments have not coalesced together to make larger filaments. In this case, the individual filaments will generally have a denier of at least 1 dpf and preferably less than or equal to 16 dpf, though the filament size may be larger if greater stiffness is desired (up to about 30 dpf). The bundles of multifilament yarn using 1–16 dpf filaments have a diameter of greater than 0.1 mm to give the formed fiber network sufficient strength to leave space between the shoe and the foot for air circulation. The projections of the products made using multifilament yarns having small individual filaments that have not been coalesced may be made more rigid by including a small amount (up to about 25% by weight, preferably 0.1% to 10% by weight) of a resin that holds the individual filaments together and makes the bundles of filaments behave more like single filaments having a larger diameter. The added resin may be an adhesive or a resin that sets by crosslinking, such as a flexible thermoset.

The fibers are made of a single thermoplastic polymer or copolymer (or optionally a blend or polymer alloy) that generally melts at a temperature in the range of about 80° C. to about 375° C. As stated above, the fiber is preferably not derived from hybrid yarn or bicomponent fiber. The polymer is preferably made into fiber by a melt spinning process. Classes of polymers that can be used to make three-dimensional fiber networks in general include polyesters, polyamides, thermoplastic copolyetherester elastomers, poly(arylene sulfides), polyolefins, aliphatic-aromatic polyamides, polyacrylates, and thermotropic liquid crystalline polymers. Polyesters, and poly(ethylene terephthalate) in particular, are preferred.

The three-dimensional fiber network structure is generally made by deforming a textile fabric into the desired shape at a temperature high enough that the fibers can be permanently deformed, as would occur, for example, in a fiber drawing process. The temperature will generally be above the glass transition temperature (Tg), and, preferably will also remain below the melting temperature. The deformation is brought about using a thermomechanical process, which means the application of a mechanical force at an elevated temperature. The mechanical force can be applied using numerous methods, such as solid phase pressure forming, vacuum bladder match plate molding, interdigitation, deep drawing, use of a heated mold, and the like. Heat and pressure are applied for a sufficient time that the textile fabric is permanently deformed, but not for such a long time or at such a high temperature (e.g. well above the melting temperature) that the filaments coalesce, causing the shaped fiber network to lose its open net-like structure and resilience. The individual filaments in the three-dimensional fiber network structure still have retained much of their individual fiber-like appearance and properties.

If a multifilament yarn is being made into a formed fiber network and the fibers are not being condensed into larger filaments by a melting process, it may be advantageous to use a yarn that is partially drawn, and thus partially oriented, rather than a yarn that has already been fully drawn and oriented to maximize tensile properties. Such a yarn is generally known as a partially oriented yarn, referred to by such acronyms as POY, LOY, or MOY. Partially oriented yarns are more readily deformed into three dimensional formed fiber networks than are more fully drawn yarns. Three dimensional formed fiber networks that are made from multifilament yarns are described in German Patent DE3801020C1 and U.S. Pat. No. 5,156,821. As stated previously, these may be made stiffer by including up to 25% of a resin (e.g. an adhesive or a flexible thermoset).

The starting two-dimensional textile fabric that is utilized in making the three-dimensional fiber network structure for use in shoes is selected from any of the standard classes of fabrics, such as knit, woven, or non-woven textile fabrics. The type of fabric depends on the kind of resulting network structure that is desired. Knit fabrics have the advantage that their structure is readily deformed without excessive elongation of individual fibers, which leads to breakage of the fibers. They are also drapable. Woven fabrics have the advantage that they are more readily produced from larger diameter fibers, such as monofils. Non-woven fabrics are difficult to make into resilient formed fiber networks and are less preferred.

DETAILED DESCRIPTION OF THE INVENTION

Figure 1:
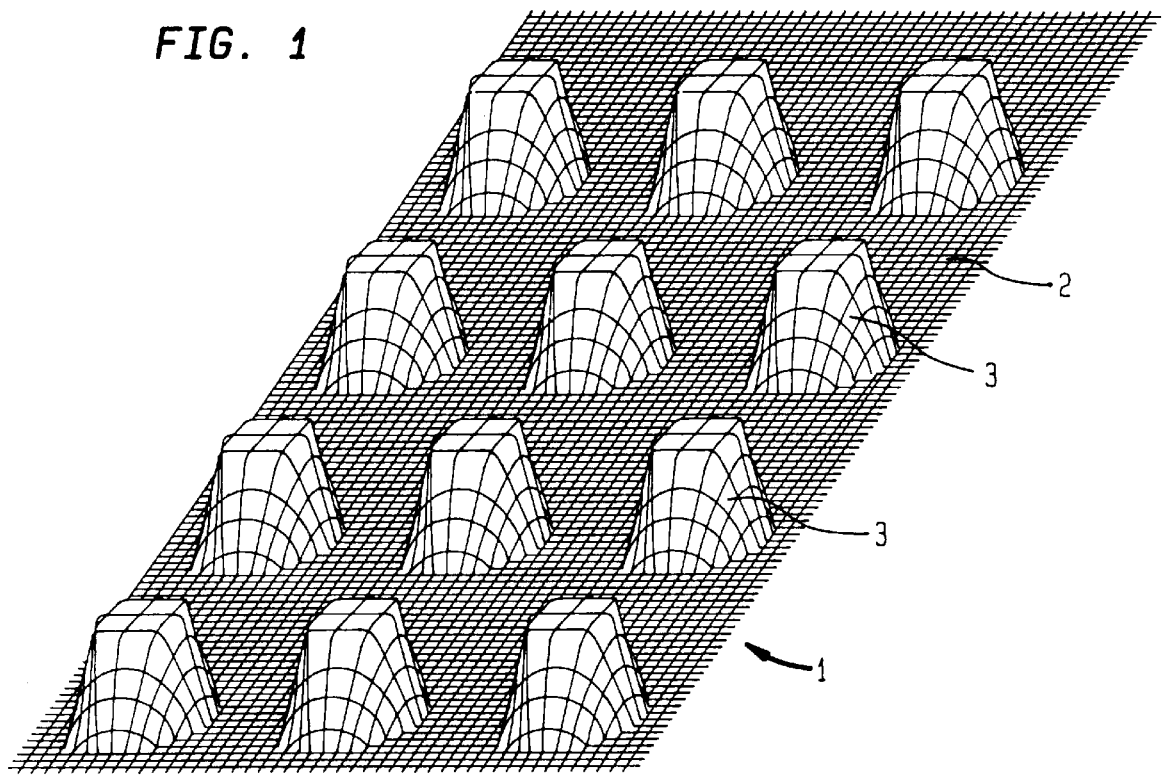
FIG. 1 shows schematically a section of a three-dimensional fiber network structure 1 having a multiplicity of "hat-shaped" projections 3 on base area 2. The open mesh structure of the fiber network is illustrated. These illustrative hat-shaped projections have a square base and square top, with the top having smaller dimensions than the base.
Figure 2:
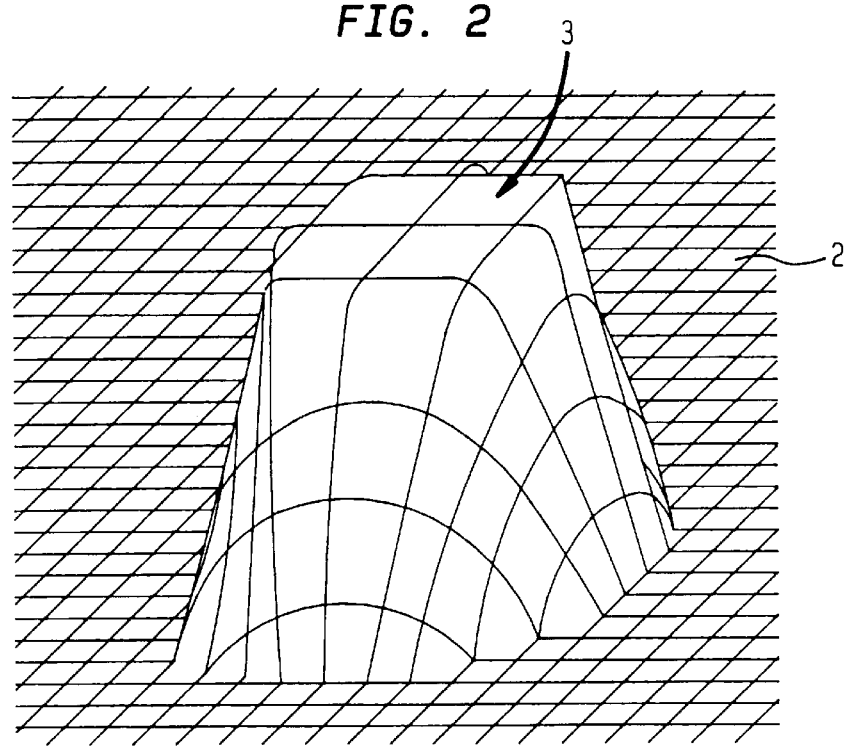
FIG. 2 schematically depicts an enlargement of one of the hat shaped projections 3 of FIG. 1, showing the widening of the mesh structure of the textile material which occurs in the area that is deformed.
Figure 3:
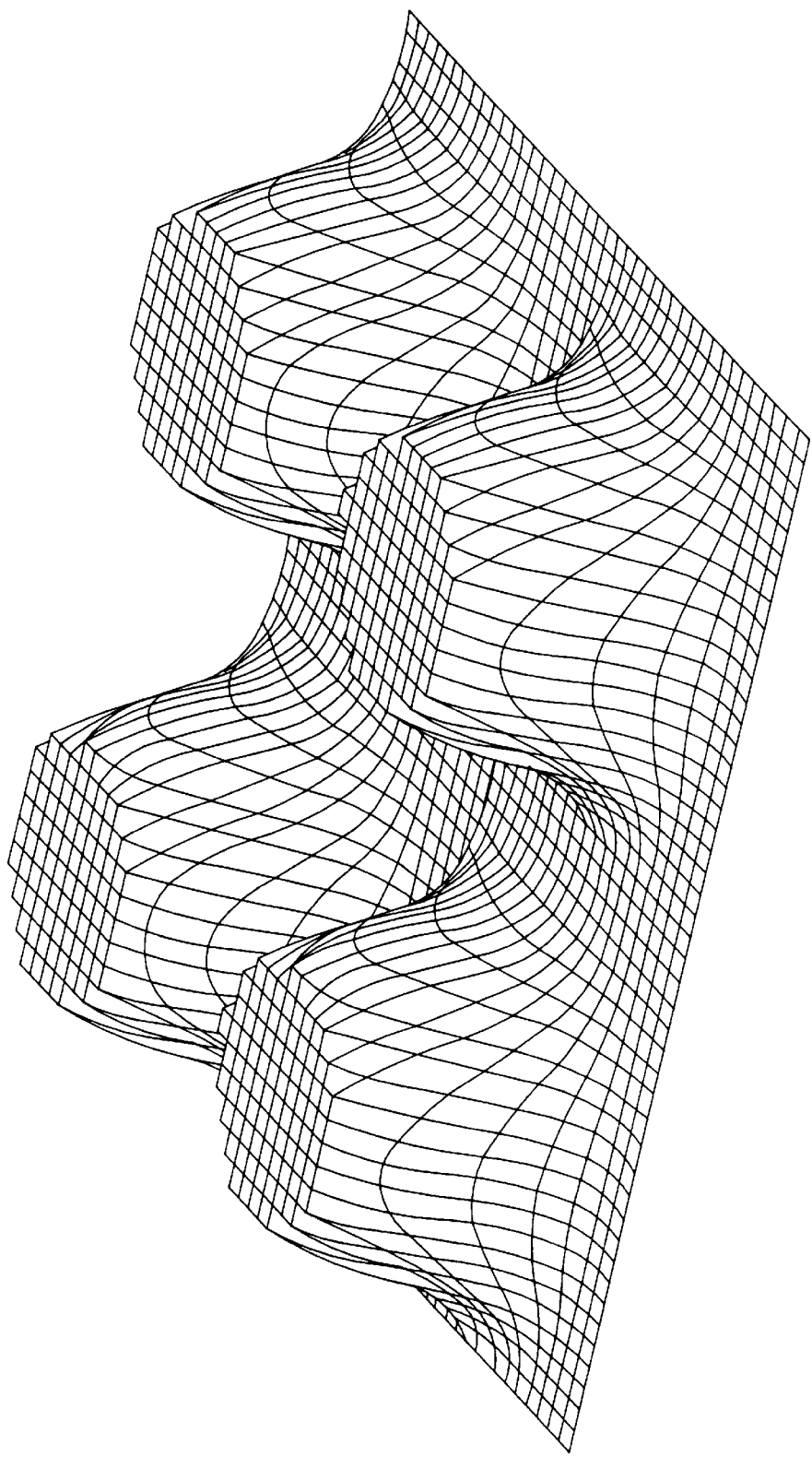
FIG. 3 schematically depicts an enlargement of four projections that are in the shape of truncated cones.

The three-dimensional fiber networks that have particular utility as cushioning materials in shoes are made up of a multiplicity of projections on the plane of the textile fabric from which the network is made. Depressions may optionally also be present on the opposite side of the fabric from the projections. Examples of rigid three-dimensional fiber networks and methods of making them are summarized in U.S. Pat. Nos. 5,364,686 and 4,631,221, herein incorporated by reference. Note that the fiber networks used herein are not rigid. The projections and optional depressions can be in the shape of cones or truncated cones, pyramids or truncated pyramids having polygonal bases, cylinders, prisms, spherical elements, and the like. Generally, the apex points or surfaces of the projections define a plane parallel to the base plane. Similarly if there are also depressions, their apex points or surfaces define a second surface, such as a plane parallel to the base plane. As a result, the preferred three-dimensional networks define two surfaces or planes, one being defined by the tops of the projections and the other being defined by either the base plane or the plane or surface defined by the depressions. Furthermore, for many uses, the projections and optional depressions are arranged in a uniform or repetitive pattern with a uniform spacing.

However, the shapes, heights, sizes and spacings of the projections and optional depressions can be modified to suit a specific application, such as shoe midsoles or collar liners. The dimensions of the projections may vary to conform to the shape of the human foot for use in shoe midsoles, and the projections may vary in rigidity to increase or decrease the weight-bearing capacity of the shoes or parts of the shoes. The projections and/or depressions can also be elongated along one direction of the plane, and in the extreme case, can run the entire length or width of the textile, in which case the projections are really corrugations, like those typically seem in cardboard. Non-corrugated structures are preferred for most shoe applications.

The sizes, heights, shapes and spacings of the pattern of projections and depressions and variations in these dimensions affect the cushioning properties and "feel" of the three-dimensional networks. The rigidity of the individual fibers in the network structure also is a major factor in determining the cushioning properties of the three-dimensional networks, and the rigidity of the fibers in turn depends on the diameter of the filaments and the kind of materials (e.g. polymers) from which the filaments are made. For most applications, using three-dimensional fiber networks, filament diameters are in the range of about 0.15 mm to about 0.7 mm. For shoe insoles (midsoles), the projections are generally 3 mm to 20 mm in height. The spacing for shoe insoles (center to center) is generally in the range of about 0.5 cm to about 3 cm.

Because of the large forces that are encountered in shoes, under the sole of the foot, the three dimensional fiber network that is used in shoe midsoles often comprises filaments that have a fairly large fiber diameter (e.g. about 0.4 mm to about 0.7 mm, and perhaps even larger). Smaller fibers may be used in other parts of the shoe (e.g. the collar liner of the shoe). The large fibers under the midsole (insole) are stiff enough to provide support, but in some cases may be too stiff to be comfortable as cushioning materials by themselves. Alternatively, to obtain a high level of comfort and cushioning, composite insoles may be used, in which the three dimensional fiber network is used as a support structure for most of the foot, with cushions made of foam, air cushions, and other kinds of polymeric cushioning materials being inserted or used at points of high stress, such as the heel and the ball of the foot. The fiber network may also be used over the entire area of the bottom of the shoe without added cushions.

The filaments in the three-dimensional fiber networks preferably consist essentially of a single thermoplastic polymer or copolymer, rather than being composites of a reinforcing fiber and a matrix polymer, such as a thermoset, which have been utilized previously for making rigid networks. The polymers may include minor amounts of additives, such as flame retardants, spinning lubricants, and the like. The thermoplastic polymers that may be used in these dimensional fiber networks generally have a melting temperature in the range of about 80° C. to about 375° C., preferably about 140° C. to about 350° C. Thermoplastic polymers that are used in general in three-dimensional formed fiber networks include: (1) polyesters of alkylene glycols having 2–10 carbon atoms and aromatic diacids. Poly(alkylene terephthalates), especially poly(ethylene terephthalate) and poly(butylene terephthalate), are particularly preferred. Also preferred are poly(alkylene naphthalates), which are polyesters of 2,6-naphthalenedicarboxylic acid and alkylene glycols, as for example poly(ethylene naphthalate); (2) thermoplastic copolyetherester elastomers; (3) polyamides, especially nylon 6 and nylon 66, which are commonly used in making fibers; (4) poly(arylene sulfides), especially poly(phenylene sulfide); (5) polyolefins, particularly polyethylene and polypropylene; (6) aliphatic aromatic polyamides, such as polyamides derived from terephthalic acid and 2-methyl-1, 5-pentanediamine; (7) polyesters derived from 1,4-cyclohexanedimethanol and terephthalic acid; and (8) thermotropic liquid crystalline polymers, such as for example polyesters derived from 6-hydroxy-2-naphthoic acid and 4-hydroxybenzoic acid.

Specific preferred polymers include poly(ethylene terephthalate) (PET), thermoplastic copolyetherester elastomers, nylon 6 and 66, polyethylene and polypropylene. PET is most preferred in most shoe applications. PET is widely available from many manufacturers, including Hoechst Celanese Corporation, Somerville, N.J. The PET should be of high enough molecular weight to be suitable for spinning into fibers; generally a molecular weight corresponding to an intrinsic viscosity (I.V.) of at least about 0.6 dl/gm is suitable, where the I.V. is determined by measuring the relative viscosity of a 4% solution (weight/volume) in o-chlorophenol at 25° C. The relative viscosity is then converted to intrinsic viscosity. Polypropylene, polyethylene and nylons are also widely available from many manufacturers. Thermoplastic copolyetherester elastomers, also referred to as thermoplastic elastomers, are well-known in the art and consist essentially of a multiplicity of recurring long chain ether ester units and short chain ester units joined head-to-tail through ester linkages. Thermoplastic copolyetherester elastomers that are composed of long chain ether ester units of poly-tetrahydrofuran and terephthalic acid and short chain ester units of 1,4-butanediol and terephthalic acid are commercially available from Hoechst Celanese Corporation under the RITEFLEX® trademark.

The spacing, size, height, and shape of the projections and optional depressions, the diameter of the filaments, and fabric construction are chosen to give the desired cushioning properties for the specific application. The shapes of the deformations depend on the process used to make them. For example, in a deformation process in which the textile fabric is held against a plate with round holes and a cylindrical rod is pushed through the hole on the same side as the textile fabric, so that the textile fabric is pushed through the hole, the projections that are made in the textile fabric will be in the shape of truncated cones (i.e., the base and top of the projections will both be round), with the diameter of the top of the cone being the diameter of the rod that pushes the textile through the hole. Similarly, if a plate with square holes and a rod with a square cross section is used, the projections will be "hat-shaped".

The fiber networks described herein are lightweight, durable and breathable. They are springy and resilient which means that they can be compressed (preferably repeatedly) without a significant loss in properties. Depending on the stiffness of the fibers and the sizes of the projections, they may be used as cushioning materials, as impact absorbing materials, or as semi-rigid support materials. In shoes, the fiber networks may serve some or all of these purposes simultaneously. Because they are generally made of only one polymer, such as PET, they can be easily recycled after use with other recyclable plastics, (e.g. bottles in the case of PET).

The fiber network materials are generally used as single layers, but they can also be used as composites. Thus they can be nested face to face, with the projections interlocking and the base planes facing out. Alternatively, they can be stacked with the projections of one layer against the base plane of the next layer, with the base planes of the two layers against each other and the projections facing out in both directions, or with the flat areas of the projections facing each other and the base planes facing out, to provide thicker spacers and cushions. The materials having more than one layer can be bonded together by such methods as adhesive bonding or ultrasonic welding. The use of multiple layers makes it possible to obtain thicker fiber networks and provides a broader range of cushioning properties.

The fiber networks described herein may be used in shoes as the insole (midsole) of the shoe, or as a part of the insole, as described above. The fiber networks may also be used as collar liners, i.e. liners that are used in the upper part of an athletic shoe to hold the shoe securely on the foot and to cushion and support the ankle and the top of the foot. They may also be used as tongue liners (i.e. liners for the tongue of the shoe). Furthermore, the three dimensional fiber network may be used under the weight bearing part of the foot as an insert into a shoe midsole or as the shoe midsole, in which case a large diameter fiber is generally used.

The use of the three dimensional fiber network in shoe designs is described in greater detail in the following non-limiting examples and drawings. In these examples and in the text above, the word "insoles" describes the part of the shoe sole that is directly above the outer sole. This is also known in the trade as the midsole, and the two words are used interchangeably.

EXAMPLES

Example 1

RITEFLEX®640 copolyetherester elastomer having a melting temperature of about 180° C., obtained from Hoechst Celanese Corporation, was melt spun to yield a 0.20 mm (435 denier) monofil having the following properties. The fiber tenacity was measured by ASTM Test Method D-3822 as 2.8 gpd, with 98% elongation at break. The elastic recovery of the fiber was measured by the same test method as 100% after 100 cycles at either 20% or 50% elongation. The monofil was knitted into a textile fabric having a wale of 8 wales/inch and a weft of 42 course/inch.

The knit fabric was shaped into a three-dimensional structure by using a heated press plate. The press plate was a metallic plate having ⅜ inch diameter holes, and was heated to about 160°–230° C. The fabric was pressed against the heated plate for 9 seconds, and pins that were ¼ inch in diameter were then pushed through the holes. This yielded truncated cone shaped projections on the fabric which were about ⅜ inch in diameter at the base and ¼ inch in diameter at the top. The projections were about 3/16 inches in height and were spaced in a square grid array with the nearest distance between the projections (center to center) being about ¾ inch.

This shaped fiber network had a soft springy feel and could be repeatedly compressed without a loss of springiness.

Example 2

RITEFLEX®672 thermoplastic copolyetherester elastomer, which melts at about 205° C., was obtained from Hoechst Celanese Corporation, and was melt spun into 823 denier monofil (about 0.28 mm in diameter). The tenacity at break of the fiber was 2.4 gpd, and it had an elongation at break of 87%, as measured by ASTM Test Method D-3822. The elastic recovery of the fiber, measured by the same method, was 100% after 100 cycles at either 20% or 50% elongation.

The fiber was knitted into a fabric having the same wale and weft as that in Example 1. The fabric was deformed into a three-dimensional network using the press plate apparatus of Example 1 under the same conditions as in Example 1. This shaped fiber network also had a soft springy feel and could be repeatedly compressed without a loss of springiness.

Example 3

Commercial PET that was made for use in textile fabrics was melt spun into a 0.182 mm monofil (about 321 denier). The monofil was then made into a plain knit fabric with 16 wales and 24 courses per inch.

The fabric samples were deformed into a three-dimensional network using a similar kind of apparatus as described in Example 1, but having ¼ inch holes in the press plate and ⅛ inch diameter cylindrical pins to yield conical projections with flat tops. The base and tops of the projections were the same as the diameter of the holes in the base plate and the diameter of the pins. The projections were arranged in a square grid array and were separated by ½ inch (center to center). The height of the projections was about ¼ inch. The projections were made by heating the base plate and the pins to 240° C. and pressing the fabric through the holes for about 30 seconds. The deformed fabric was resilient and had a comfortable, springy feel when pressed down by hand, and retained its feel even after multiple compressions.

Example 4

A series of poly(ethylene terephthalate) (PET) fabric samples (both knit and woven) were made into three dimensional fiber network materials by the method of pressing the fabric against a heated base plate having a square grid array of evenly spaced holes at about 200° C. for two minutes and then pushing the fabric through holes in the base plates using cylindrical pins that were heated to about 180° C. The pins were kept in place (projected through the holes at temperature) for 15 seconds before being withdrawn, except in Sample No. 4 (below), where the pins were kept in place for 600 seconds. This resulted in three-dimensional networks of cone-shaped projections with flat tops which were evenly spaced and in which the bases of the projections had the diameter of the holes and the tops of the projections had the diameter of the pins. The heights of the projections (the thickness of the samples) was somewhat less than the depth of the penetrations through the holes by the pins due to shrinkage after the mechanical force was removed. Both knit and woven fabrics were tested.

These samples were subjected to compression tests using a modification of methods that are used for polyurethane foams and latex foams. Samples of the materials were placed between the plates of an Instron tensile tester and then pre-loaded to a load of 0.02 psi. The distance between the plates at 0.02 psi of compression was defined as the thickness of the sample. The samples were then compressed to 60% compression for two cycles at test speeds of 0.2 in/min for samples 0.10–0.29 inches in thickness, 0.5 in/min for samples 0.30–0.69 inches in thickness, and 1.0 in/min for samples 0.70–1.39 inches in thickness. The two pre-cycles above made a significant change in two of the samples (Nos. 4 and 6 in Table 1); the precycling measurements are also reported for these two samples. Six minutes after the pre-cycling above, a compression test was run to 60% compression at the same speed as in the pre-cycling. Stress and percent compression were measured, and the stress at 25% and 50% compression was measured. These values are recorded in Table 1, along with the averages for runs where there were duplicate measurements. These measurements show an increase in stress with increasing compression, which is a characteristic that is desirable for cushioning applications.

The apparent volume was computed based on the thickness as measured at 0.02 psi above and the measured dimensions (length and width) of the sample. This was used to compute the apparent density, which ranged from 0.016 to 0.067 gms/cc. By comparison solid PET has a density of about 1.4 gms/cc. Thus the apparent density of the three dimensional fiber network is less than about 5% of the density of solid PET (1.1%–4.8% in these examples). The apparent densities of the samples in gms/cc are also listed in Table 1; these can be converted to pounds/cu. ft. by multiplying by 62.4.

Example 5

Figure 4:
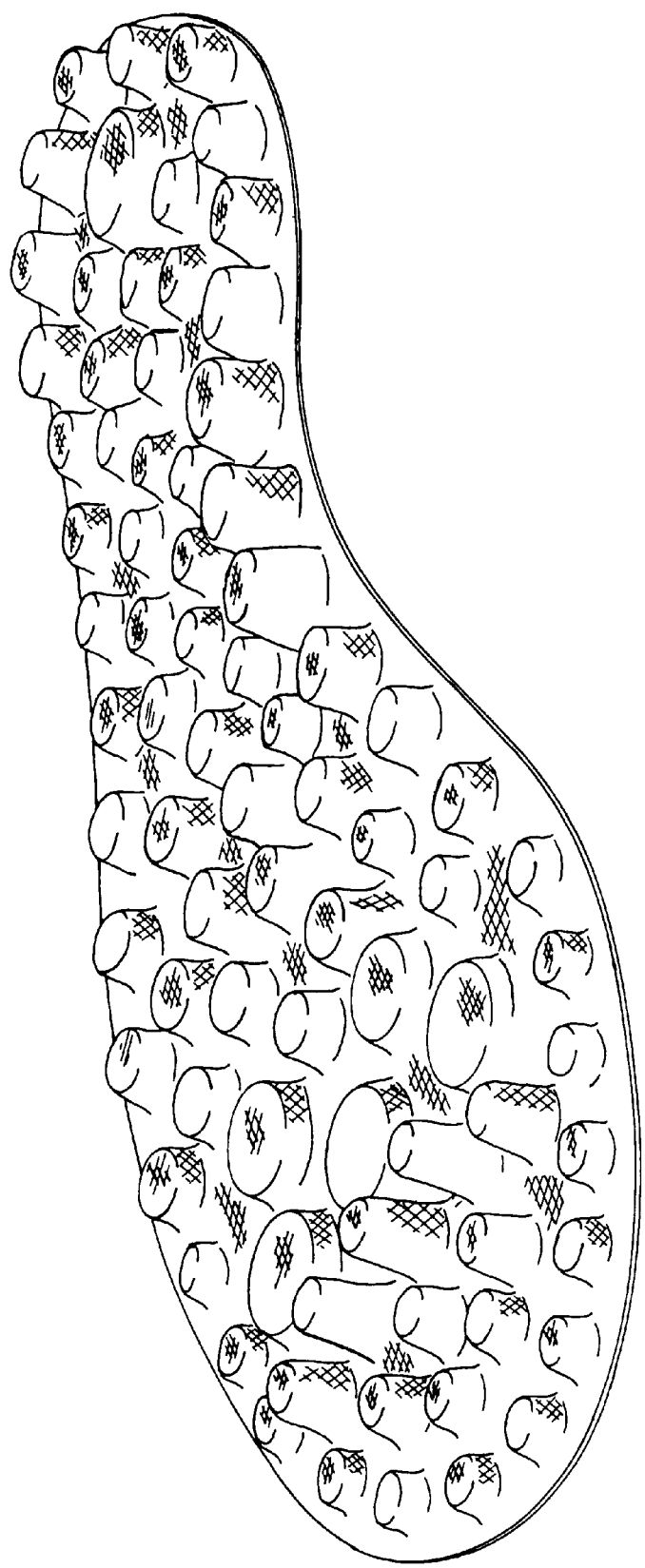
FIG. 4 illustrates a shoe midsole made from the formed fiber product with projections of varying size to contour to the shape of the bottom of the foot.

The formed fiber network in a shoe insole (midsole) is ergonomically contoured to the shape of the foot, as shown in FIG. 4. The projections, which are truncated cones in this example, vary in height, shape, diameter, and spacing in conformance with the shape of the foot and in accordance with the stresses that are encountered in different parts of the foot. The filament diameters also vary according to the kinds of stresses that are expected. The fiber network illustrated in FIG. 4 covers the entire shoe insole, without the use of inserts made of foam or other materials in the parts of the shoe undergoing the highest stress. The fiber network can be made in a mold in which one half of the mold has heated cylindrical rods and the other half of the mold has round holes. The heated rods push the fabric through the holes in the other half of the mold, to make the deformed midsole of the shoe.

Example 6

Shoe insoles (midsoles) can be made that include foam as part of the cushioning structure. For example, a piece of ethylene-vinyl acetate (EVA) foam is made in the shape of the bottom of the shoe. The foam piece is die-cut so that it has holes all the way through that are the same diameter as the compressions of a three-dimensional fiber network. The foam piece has channels cut into the underside that connect adjacent holes. A matching piece of fiber network is made that is in the shape of the bottom of the shoe and that matches the pattern of channels and holes in the foam piece. The projections fit into the holes in the foam piece, and the tops of the projections are approximately flush with the upper side of the foam piece. The fiber network also has elongated channels that connect the projections with one another and that fit into the channels in the foam piece.

The fiber network and foam piece are placed in the bottom of the shoe with the fiber network on the bottom and with the projections pointing up. The foam piece is on top of the fiber network with the projections and channels in the fiber network fitting into the holes and channels in the foam. A liner is placed on top of the foam piece. The foot of the user of the shoe rests on top of the liner. The liner is made of a material that wicks moisture away from the foot. This design provides air circulation and moisture removal at the bottom of the shoe through the network of channels that interconnect the projections.

The fiber network is made in a mold by a thermomechanical process as described previously. One half of the mold has pins projecting upward that are ½" in diameter and ½" in height. Metal ridges connecting adjacent pins are used to make the channels that connect the projections and are ⅛" in height and ⅛" in width, with a 45° chamfer that is 1/32" from the top on both sides. The other half of the mold has holes that are ¾" in diameter and channels between the holes corresponding to the pieces of metal that are between adjacent pins. This mold yields the pattern of projections and channels described above upon heating a flat piece of textile fabric to a temperature above the glass transition temperature of the fabric.

Note that the projections in this example are all the same height because the foam liner has a uniform thickness. The thickness of the foam liner and the heights of the projections can be contoured so that the combination of foam and three-dimensional fiber product follows the contours of the bottom of the foot.

Example 7

A shoe insole (midsole) design uses the fiber network as described in Examples 5 and 6, with the further modification that foam inserts are placed in the high impact areas, such as the heel and the ball of the foot. The fiber network is cut away and is flat (i.e. there are no projections) in the location having the foam inserts.

Example 8

Foam cushions can also be made with patterns of projections that conform to the contours of the bottom of the foot. Furthermore, these can be reinforced with the three-dimensional fiber network. For example, a piece of EVA foam is molded with a pattern of projections that follows the contours of the bottom of the foot, much like the formed fiber network illustrated in FIG. 4. A piece of formed fiber network is made with the same matching pattern of projections and is placed over the piece of foam. The projections in the EVA foam rest inside the projections of the fiber network, resulting in a structure in which the fiber network reinforces the foam projections and prevents them from being sheared off during use. Shoe midsoles having this design may also utilize foam inserts in the areas of high impact (ball of the foot and heel).

Example 9

The fiber network is also useful for making electrically heated shoes. A battery-operated electric heater is placed in the bottom of the inside of shoe. The fiber network is placed above the shoe sole and the heater, which is on or in the top of the shoe sole. The fiber network insole (midsole) acts as a spacer between the heating element and the bottom of the foot. This creates an air space between the heating element and the foot. The air space allows air circulation and much more even heating of the foot than is encountered when the heating element is placed nearer the bottom of the foot without an air gap. There are no hot spots or cold spots in this design. The heated shoe is therefore much more comfortable.

Example 10

The fiber network also may be used as a lining material for the upper/collar part of the shoe. The fiber network acts as a spacer between the foot and ankle and the upper part of the shoe, allowing air to circulate and perspiration to evaporate. The material used in this application most often now is foam, which causes the foot to become warm and wet.

For example, a hiking boot and other kinds of footwear may utilize a design in which the upper part of the boot is lined with the formed fiber network. The inner sole of the boot utilizes the channeled insole described in Example 6 for complete circulation of air around the ankle and the foot, including the bottom of the foot. The fiber network lining has relatively small, soft projections for greater comfort. Note that the hardness or softness of the projections in the upper part of the shoe or boot can be adjusted to compress and decompress under the weight of the foot, thereby massaging the foot.

Removable upper liners may also be used in shoes and boots. The removable liners utilize fabric with relatively small, soft projections. The liners are comfortable, breathable, and provide good thermal insulation for cold weather. They can also be laundered.

The above examples illustrate the use of formed fiber networks in various shoe designs. These do not include all the various other layers of material that may be used, such as additional foam or cloth layers, which may be included for enhanced softness, for moisture absorption, or for other reasons. Numerous variations in the arrangement of the fiber and other materials are also readily envisioned. The foam layers that are used as an integral part of the shoe insole (e.g. for enhanced shock absorption) can be made of materials other than EVA, such as polyurethane, latex, or rubber.

The examples are illustrative only, and numerous variations will be readily apparent to practitioners in the art. The above embodiments and examples should therefore not be viewed as limitations on the scope of this invention.

wherein said three-dimensional fiber network has as a base plane the plane of said two-dimensional textile fabric;

wherein said three-dimensional fiber network comprises a multiplicity of projections comprised of said two-dimensional textile fabric rising above said base plane;

wherein said projections are resilient, returning, substantially to their original shape after being compressed to 50% of their original height;

wherein said fiber network comprises thermoplastic filaments having a diameter of at least about 0.1 mm.

2. A shoe as recited in claim 1, wherein said projections have a shape selected from the group consisting of cones, truncated cones, pyramids having polygonal bases, truncated pyramids having polygonal bases, cylinders, prisms, and spherical elements.

3. The shoe as recited in claim 1, said projections having tops selected from the group consisting of apex points and flat tops, wherein said tops define a surface.

4. The shoe as recited in claim 1, wherein said thermoplastic filaments consist essentially of a thermoplastic material selected from the group consisting of polymers and copolymers and wherein said filaments are monofils.

5. The shoe as recited in claim 4, wherein said thermoplastic material has a melting temperature in the range of about 80° C. to about 375° C.

6. The shoe as recited in claim 4, wherein said thermoplastic material is selected from the group consisting of

TABLE 1

| | | | | | Compression Tests | | | | |
|---|---|---|---|---|---|---|---|---|---|
| Sample No. | Fabric Type[1] | Penetration (inches) | Fiber Diameter (mm) | Measured Thickness[2] (inches) | Network Spacings[3] (inches) | Apparent Density (gms/cc) | Specimen No. | Stress @ 25% Compression (psi) | Stress @ 50% Compression (psi) |
| 1 | Woven 37 × 37 | 0.313 | 0.25 | 0.195 | ½ × ¾ × 1 | 0.047 | 1 | 1.07 | 1.73 |
| | | | | | | | 2 | 1.11 | 1.73 |
| | | | | | | | avg | 1.09 | 1.73 |
| 2 | Woven 20 × 20 | 0.313 | 0.40 | 0.200 | ½ × ¾ × 1 | 0.065 | 1 | 2.22 | 3.26 |
| | | | | | | | 2 | 2.32 | 3.37 |
| | | | | | | | avg | 2.27 | 3.31 |
| 3 | Knit | 0.363 | 0.20 | 0.345 | ½ × ¾ × 1 | 0.023 | 1 | 0.27 | 0.79 |
| | | | | | | | 2 | 0.29 | 0.83 |
| | | | | | | | avg | 0.28 | 0.81 |
| 4 | Knit | 0.563 | 0.20 | 0.495 | ½ × ¾ × 1 | 0.016 | 1 | 0.53 | 0.90 |
| | | | | | | | 2 | 0.55 | 0.90 |
| | | | | | | | 3 | 0.82 | 1.00 |
| | | | | | | | —[4] | — | — |
| 5 | Woven 37 × 37 | 0.188 | 0.25 | 0.140 | ¼ × ⅜ × ½ | 0.064 | 1 | 5.44 | 8.01 |
| | | | | | | | 2 | 5.68 | 9.09 |
| | | | | | | | avg | 5.56 | 8.55 |
| 6 | Woven 20 × 20 | 0.188 | 0.40 | 0.193 | ¼ × ⅜ × ½ | 0.067 | 1 | 13.73 | 23.45 |
| | | | | | | | 2 | 20.21 | 34.07 |
| | | | | | | | —[5] | — | — |
| 7 | Knit | 0.313 | 0.20 | 0.195 | ¼ × ⅜ × ½ | 0.040 | 1 | 1.11 | 2.98 |
| | | | | | | | 2 | 1.11 | 3.04 |
| | | | | | | | avg | 1.11 | 3.01 |

[1]The knit fabrics were a plain Jersey knit having approximately 17 wales/inch and approximately 38 courses/inch. For the woven fabrics, the units are given in yarns per inch.
[2]At 0.02 psi
[3]Diameter at top of projection × diameter at bottom of projection × spacing (center to center), in inches.
[4]Pre-cycling significantly changes load curve characteristics. Specimens #1 and #2 were run with pre-cycling. Specimen #3 was run without pre-cycling.
[5]Pre-cycling significantly changes load curve characteristics. Specimen #1 was run with pre-cycling. Specimen #2 was run without pre-cycling.

We claim:

1. A shoe comprising at least one layer of a three-dimensional fiber network, said three-dimensional fiber network having been made by deforming a two-dimensional textile fabric;

polyesters, polyamides, thermoplastic copolyetherester elastomers, poly(arylene sulfides), polyolefins, aliphatic-aromatic polyamides, polyacrylates, and thermotropic liquid crystalline polymers.

7. The shoe as recited in claim 4, wherein said thermoplastic material is selected from the group consisting of poly(ethylene terephthalate), polypropylene, polyethylene, nylon 6, and nylon 66.

8. The shoe as recited in claim 1, wherein said filaments in said three-dimensional fiber network cross over one another at intersections, wherein said filaments at said intersections are not bonded to one another.

9. The shoe as recited in claim 1, wherein the apparent density of said three-dimensional fiber network is less than about 10% of the density of said thermoplastic filaments.

10. The shoe as recited in claim 1, wherein said textile fabric also comprises depressions.

11. The shoe as recited in claim 1, said filaments having a diameter in the range of about 0.15 mm to about 0.7 mm.

12. The shoe as recited in claim 1, wherein said shoe comprises a midsole, wherein the midsole comprises said three-dimensional fiber network.

13. The shoe as recited in claim 1, wherein said shoe comprises a collar lining, wherein the collar lining comprises said three-dimensional fiber network.

14. The shoe as recited in claim 1, wherein said shoe comprises a tongue lining, wherein the tongue lining comprises said three-dimensional fiber network.

15. A shoe midsole comprising at least one layer of a three-dimensional fiber network, said three-dimensional fiber network having been made by deforming a two-dimensional textile fabric;

wherein said three-dimensional fiber network has as a base plane the plane of said two-dimensional textile fabric;

wherein said three-dimensional fiber network comprises a multiplicity of projections comprised of said two-dimensional textile fabric rising above said base plane;

wherein said projections are resilient, returning substantially to their original shape after being compressed to 50% of their original height;

wherein said fiber network comprises thermoplastic filaments having a diameter of at least about 0.1 mm.

16. The midsole as recited in claim 15, wherein said thermoplastic filaments consist essentially of a thermoplastic material selected from the group consisting of polymers and copolymers and wherein said filaments are monofils.

17. The midsole as recited in claim 16, wherein said thermoplastic filaments have a diameter in the range of about 0.4 mm to about 0.7 mm.

18. The midsole as recited in claim 16, wherein the heights of said projections range from about 3 mm to about 20 mm and are contoured like the bottom of a foot.

19. The midsole as recited in claim 16, wherein said projections have centers, wherein the spacing between the centers of said projections is in the range of about 0.5 cm to about 3 cm.

20. The midsole as recited in claim 15, said midsole further comprising one or more cushions in areas of the shoe subject to high impact.

21. The midsole as recited in claim 20, wherein said cushion is made of a polymeric foam selected from the group consisting of ethylene-vinyl acetate copolymer, polyurethane, latex, rubber, and mixtures thereof.

22. A heated shoe comprising the midsole recited in claim 15 and a heater in said midsole.

23. A shoe midsole as recited in claim 15, wherein said projections have a shape selected from the group consisting of cones, truncated cones, pyramids having polygonal bases, truncated pyramids having polygonal bases, cylinders, prisms, and spherical elements.

24. A lining material for use in a part of a shoe selected from the group consisting of the tongue and collar lining, said material comprising at least one layer of a three-dimensional fiber network, said three-dimensional fiber network having been made by deforming a two-dimensional textile fabric;

wherein said three-dimensional fiber network has a base plane the plane of said two-dimensional textile fabric;

wherein said three-dimensional fiber network comprises a multiplicity of projections comprised of said two-dimensional textile fabric rising above said base plane;

wherein said projections are resilient, returning substantially to their original shape after being compressed to 50% of their original height;

wherein said fiber network comprises thermoplastic filaments having a diameter of at least about 0.1 mm.

25. The lining material as recited in claim 24, wherein said thermoplastic filaments consist essentially of a material selected from the group consisting of a thermoplastic polymer and copolymer.

26. The lining material as recited in claim 25, wherein said thermoplastic filaments comprise poly(ethylene terephthalate).

27. A lining material as recited in claim 24, wherein said projections have a shape selected from the group consisting of cones, truncated cones, pyramids having polygonal bases, truncated pyramids having polygonal bases, cylinders, prisms, and spherical elements.

* * * * *